US009388760B2

(12) United States Patent
Katsurahara

(10) Patent No.: US 9,388,760 B2
(45) Date of Patent: Jul. 12, 2016

(54) FUEL INJECTION CONTROL DEVICE FOR INTERNAL COMBUSTION ENGINE

(71) Applicant: DENSO CORPORATION, Kariya, Aichi-pref. (JP)

(72) Inventor: Hiroshi Katsurahara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 266 days.

(21) Appl. No.: 14/358,546

(22) PCT Filed: Oct. 24, 2012

(86) PCT No.: PCT/JP2012/006809

§ 371 (c)(1),
(2) Date: May 15, 2014

(87) PCT Pub. No.: WO2013/073111

PCT Pub. Date: May 23, 2013

(65) Prior Publication Data

US 2014/0311459 A1 Oct. 23, 2014

(30) Foreign Application Priority Data

Nov. 18, 2011 (JP) ................................ 2011-253327

(51) Int. Cl.
*G06F 7/00* (2006.01)
*G06F 17/00* (2006.01)
(Continued)

(52) U.S. Cl.
CPC .............. *F02D 41/30* (2013.01); *F02D 41/247* (2013.01); *F02D 41/20* (2013.01); *F02D 41/403* (2013.01); *F02D 2041/2058* (2013.01); *F02D 2200/063* (2013.01)

(58) Field of Classification Search
CPC ....... F02D 41/30; F02D 41/247; F02D 41/14; F02D 41/403; F02D 2041/2058; F02D 2200/063; F02D 41/20; F02D 41/2467; F02D 41/2438
See application file for complete search history.

(56) References Cited

U.S. PATENT DOCUMENTS 4,438,496 A * 3/1984 Ohie ....................... F02D 41/14 123/458
5,878,722 A * 3/1999 Gras ....................... F02D 41/20 123/506

(Continued)

FOREIGN PATENT DOCUMENTS

JP 2002-021679 1/2002
JP 2010-073705 4/2010

(Continued)

OTHER PUBLICATIONS

Office Action (2 pages) dated Nov. 13, 2014, issued in corresponding Japanese Application No. 2011-253327 and English translation (2 pages).

(Continued)

*Primary Examiner* — Mahmoud Gimie
*Assistant Examiner* — David Hamaoui
(74) *Attorney, Agent, or Firm* — Nixon & Vanderhye PC

(57) ABSTRACT

When a given learning performance condition is met, a partial lift injection for opening a fuel injector is performed by an injection pulse which brings about a partial lift state in which a lift quantity of a valve body of the fuel injector does not reach a full lift position, and an integrated value of a drive current is calculated which flows through a drive coil of the fuel injector after an injection pulse of the partial lift injection is turned off. An inductance of the drive coil is calculated in consideration of a direct current superposition characteristic of the drive coil on the basis of the integrated value of the drive current, whereby the inductance of the drive coil is calculated with high accuracy. Then, the lift quantity of the valve body is estimated on the basis of the inductance, whereby the lift quantity of the valve body is estimated with high accuracy. The injection pulse of the partial lift injection is corrected on the basis of the lift quantity, whereby the injection pulse of the partial lift injection is corrected with high accuracy.

7 Claims, 11 Drawing Sheets

(51) Int. Cl.

| | |
|---|---|
| ***F02D 41/30*** | (2006.01) |
| ***F02D 41/24*** | (2006.01) |
| *F02D 41/20* | (2006.01) |
| *F02D 41/40* | (2006.01) |

(56) References Cited

U.S. PATENT DOCUMENTS

| | | | | |
|---|---|---|---|---|
| 7,522,987 | B2 * | 4/2009 | Fujii | F02D 41/1497 123/486 |
| 2006/0137661 | A1 | 6/2006 | Hayakawa | |
| 2009/0013962 | A1 | 1/2009 | Ashizawa et al. | |

FOREIGN PATENT DOCUMENTS

| | | | | |
|---|---|---|---|---|
| JP | 2010-532448 | | 10/2010 | |
| JP | 2011-163156 | | 8/2011 | |
| JP | 2011163156 A | * | 8/2011 | F02D 41/20 |

OTHER PUBLICATIONS

International Search Report and Written Opinion for PCT/JP2012/006809, mailed Dec. 11, 2012.

Office Action (3 pages) dated Jun. 30, 2015, issued in corresponding Korean Application No. 10-2014-7012919 and English translation (3pages).

Office Action (6 pages) dated Nov. 3, 2015, issued in corresponding Chinese Application No. 201280056566.5 and English translation (8 pages).

* cited by examiner $$Lpl = A \times Iiplave + B$$

(A, B : COEFFICIENT)

$$Liftpl = \frac{C}{Lpl - D} - Lift0$$

(Lift0 : GAP AT TIME OF FULL LIFT
C, D : COEFFICIENT)

FUEL INJECTION CONTROL DEVICE FOR INTERNAL COMBUSTION ENGINE

CROSS REFERENCE TO RELATED APPLICATION

This application is the U.S. national phase of International Application No. PCT/JP2012/006809 filed on Oct. 24, 2012, which designated the U.S. and is based on Japanese Patent Applications No. 2011-253327 filed on Nov. 18, 2011, the disclosure of each of which are incorporated herein by reference.

TECHNICAL FIELD

The present disclosure is an invention related to a fuel injection control device for an internal combustion engine provided with a function of correcting an injection pulse of a fuel injector of the internal combustion engine.

BACKGROUND ART

In a fuel injection control system of an internal combustion engine, a required injection quantity is calculated according to an operating state of the internal combustion engine and a fuel injector is opened by an injection pulse of a pulse width corresponding to the required injection quantity to thereby inject fuel of the required injection quantity.

In the fuel injector of an internal combustion engine of a direct injection type in which the fuel of high pressure is injected into a cylinder, as shown in FIG. 3, the linearity of a change characteristic of an actual injection quantity with respect to an injection pulse width tends to be worse in a partial lift range (range which brings about a partial fit state in which the lift quantity of a valve body does not reach a full lift position because an injection pulse is short). In the partial lift range, variations in the lift quantity of the valve body (for example, needle valve) tend to increase, which hence tends to increase variations in an injection quantity. When the variations in the injection quantity are increased, there is a possibility that exhaust emission and drivability may be made worse.

In a patent document 1 (JP-T 2010-532448) is described a method for correcting variations in an injection quantity of a fuel injector. A point, which is not smooth in a time derivative of current flowing through a drive coil when a given erasing voltage is applied to the drive colt at the time of closing the fuel injector, is detected as a valve closing point, and the duration of a drive control is found on the basis of the valve closing point.

In a fuel injection control method described in a patent document 2 (WO 2004/53317), an integrated value of an actual current is calculated which flows through a coil when a drive pulse of a fuel injector is turned on and the drive pulse is corrected on the basis of the result of comparison between the integrated value of the actual current and the integrated value of a reference current.

In a plunger position detection device described in a patent document 3 JP-A 2010-73705), a convergence time required for a counter electromotive voltage developed at the time of turning off current passed through a solenoid coil to converge to a given threshold value is detected by using a fact that the inductance of a solenoid coil correlates with the position of a plunger. The inductance of the solenoid coil is calculated on the basis of the convergence time of the counter electromotive voltage. By detecting the position of the plunger on the basis of the inductance, the position of a valve body coupled to the plunger is detected.

RELATED TECHNICAL DOCUMENT

Patent Document

[Patent Document 1] JP-T No. 2010-532448

[Patent Document 2] WO No. 2004/5331

[Patent Document 3] JP-A No. 2010-73705

As shown in FIG. 4, in a partial lift range, an injection pulse is turned off around the time when the lift quantity of a valve body increases along with an increase in a drive current (current flowing through a drive coil) which is caused by the injection pulse being turned on, so that the valve body shows a behavior such that after the injection pulse is turned off, the lift quantity of the valve body once increases and then decreases. However, in the techniques described in the patent documents 1, 2, the behavior of the lift quantity in the partial lift range is never taken into consideration, so that variations in an injection quantity caused by variations in the lift quantity in the partial lift range cannot be corrected with high accuracy.

As shown in FIG. 5, the drive coil has a direct current superposition characteristic in which the inductance is varied according to the drive current (current flowing through the drive coil), but the technique described in the patent document does not at all take into account the direct current superposition characteristic of the drive coll. For this reason, it is difficult to calculate the inductance on the basis of the convergence time of a counter electromotive voltage with high accuracy; and hence it is difficult to detect the position of a plunger (position of the valve body) with high accuracy on the basis of the inductance. Hence, it is difficult to correct the variations in the injection quantity caused by the variations in the lift quantity in the partial lift range with high accuracy.

SUMMARY OF THE INVENTION

A problem to be solved by the present disclosure is to provide a fuel injection control device for an internal combustion engine that can correct variations in an injection quantity caused by variations in a lift quantity in a partial lift range with high accuracy and that can improve an injection quantify control accuracy in the partial lift range.

According to the present disclosure, a fuel injection control device is for an internal combustion engine provided with a fuel injector in which a valve body is opened by an electromagnetic force of a drive coil. The fuel injection control device includes a fuel injection part that performs a full lift injection for opening the fuel injector by an injection pulse in which a lift quantity of the valve body reaches a full lift position and a partial lift injection for opening the fuel injector by an injection pulse in which a lift quantity of the valve body does not reach the full lift position, a lift quantity estimation part that calculates an inductance of the drive coil in consideration of a direct current superposition characteristic of the drive coil on the basis of a drive current flowing through the drive coil after an injection pulse of the partial lift injection is turned off and that estimates a lift quantity of the valve body at the time of the partial lift injection or the basis of the inductance; and an injection pulse correction part that corrects the injection pulse of the partial lift injection on the basis of the lift quantity of the valve body estimated by the lift quantity estimation part.

In this fuel injection control device, by paying attention to a fact that in the partial lift range, the valve body shows a behavior such that after an injection pulse is turned off, the lift quantity of the valve body once increases and then decreases, the inductance of the drive coil is calculated from the drive current after the injection pulse is turned off. Further, by paying attention to a fact that the inductance of the drive coil after the injection pulse being turned off shows the direct current superposition characteristic in which the inductance is successively changed according to a decrease in the drive current, the inductance of the drive coil is calculated on the basis of the drive current flowing through the drive coil after the injection pulse of the partial lift infection is turned off, whereby the inductance of the drive coil can be calculated with high accuracy. Hence, by estimating the lift quantity of the valve body on the basis of this inductance, the lift quantity of the valve body can be estimated with high accuracy. Then, by correcting the injection pulse of the partial lift injection on the basis of the lift quantity estimated with high accuracy, the injection pulse of the partial lift injection can be corrected with high accuracy. In this way, variations in the injection quantity caused by variations in the lift quantity in the partial lift range can be corrected with high accuracy and hence an injection quantity control accuracy in the partial lift range can be improved.

When the fuel injection part performs the partial lift injection, it is recommended that the fuel injection part injects a required injection quantity according to an operating state of the internal combustion engine separately in an injection quantity of the partial lift injection and in an injection quantity of the full lift injection. In this way, the partial lift injection can be performed with the total injection quantity of the fuel injector kept at the required injection quantity.

The lift quantity estimation part estimates the lift quantity at the time of the partial lift injection in a case where a given performance condition is met. It is recommended that the given performance condition is met at least when a load of the internal combustion engine is not less than a given value and that the given value is set at a value corresponding to an intake air volume in which variations in an air-fuel ratio caused by variations in an injection quantity of the partial lift injection is within a given allowable range. In this way, when the load of the internal combustion engine is not less than the given value and the variations in the air-fuel ratio caused by the variations in the injection quantity of the partial lift injection is within the given allowable range. It is possible to correct the injection pulse of the partial lift injection by performing the partial lift injection. Hence, it is possible to prevent a combustion state from being made worse by the partial lift injection for correcting the injection pulse.

The lift quantity estimation part may integrate the drive current flowing through the drive coil after the injection pulse of the partial lift injection is turned off to thereby calculate the inductance of the drive coil in consideration of the direct-current superposition characteristic of the drive coil. In this way, the inductance of the drive coil can be calculated with high accuracy.

The lift quantity estimation part may include a rise time detection part and an inductance correction part, in which the rise time detection part detects a required time as the information of a change in the inductance caused by a factor other than the lift quantity of the valve body the required time being required for the drive current to increase to a given value or more from the time when the injection pulse of the partial lift injection is turned on, and in which the inductance correction part corrects the inductance according to the required time detected by the rise time detection part. In this way, the inductance can be found in consideration of a change in the inductance caused by a factor (for example, temperature or the like) other than the lift quantity of the valve body.

The fuel injection control device for an internal combustion engine may include a part for prohibiting the partial lift injection and the correction of the injection pulse of the partial lift injection in a case where variations in the injection quantity in the full lift injection in which the lift quantity of the valve body reaches the full lift position is more than a given range and/or in a case where the required time, which is required for the drive current to increase to a given value or more from the time when the injection pulse of the partial lift injection is turned on, is more than a determination value. In this way, in the case where the variations in the injection quantity in the full lift injection is more than the given range and/or in the case where the required time, which is required for the drive current to increase to the given value or more from the time when the injection pulse of the partial lift injection is turned on, is more than the determination value, it is determined that since the fuel injector is abnormal, even if the partial lift injection is performed to thereby correct the injection pulse of the partial lift injection, the variations in the injection quantity cannot be corrected with high accuracy. Hence, it is possible to prohibit the partial lift injection and the correction of the injection pulse of the partial lift injection.

The fuel injection control device for an internal combustion engine may include a part for prohibiting a partial lift injection other than the partial lift injection for correcting the injection pulse until the correction of the injection pulse of the partial lift injection is completed. In this way, it is possible to prevent exhaust emission and drivability from being made worse by the variations in the injection quantity of the partial lift injection before the correction of the injection pulse of the partial lift injection is completed.

BRIEF DESCRIPTION OF THE DRAWINGS

The object described above and other objects, features, and advantages of the present disclosure will be made clearer by the detailed descriptions to be described below with reference to drawings to be accompanied. The drawings to be accompanied are as follows.

MODE FOR CARRYING OUT THE INVENTION

Figure 1:
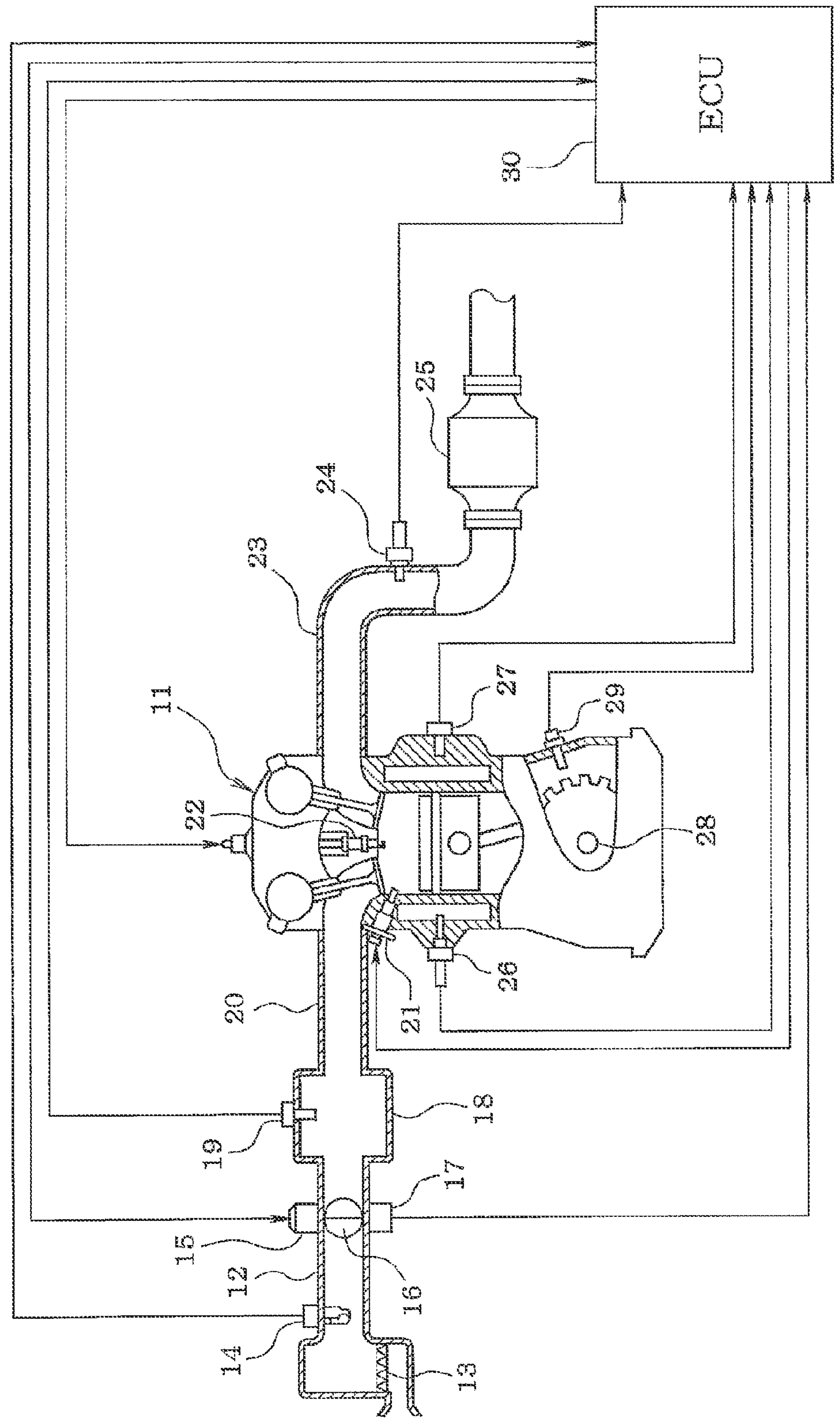
FIG. 1 is a diagram to show a general construction of an engine control system in an embodiment of the present disclosure.

Hereinafter, an embodiment of embodying a mode for carrying out the present disclosure will be described.

A direct injection type engine 11 of an internal combustion engine of a direct injection type has an air cleaner 13 provided on an uppermost stream part of an intake pike 12 and has an air flow meter 14 provided on an downstream side of the air cleaner 13, the air flow meter 14 detecting an intake air volume. On the downstream side of the air flow meter 14 are provided a throttle valve 16, whose opening is controlled by a motor 15, and a throttle opening sensor 17 for sensing an opening (throttle opening) of the throttle valve 16.

On the downstream side of the throttle valve 16 is provided a surge tank 18, and the surge tank 18 is provided with an intake pipe pressure sensor 19 for sensing an intake pipe pressure. Further, the surge tank 18 is provided with an intake manifold 20 for introducing air into respective cylinders of the engine 11. Each of the cylinders of the engine 11 is provided with a fuel injector 21 for directly injecting fuel into the cylinder. A cylinder head of the engine 11 has an ignition plug 22 provided for each cylinder and an air-fuel mixture in the cylinder is ignited by a spark discharge of the ignition plug 22 of each cylinder.

An exhaust pipe 23 of the engine 11 has an emission gas sensor 24 (air-fuel ratio sensor, oxygen sensor, or the like) for sensing an air-fuel ratio of an emission gas or whether the emission gas is rich or lean. A catalyst 25 of a three-way catalyst or the like for cleaning an emission gas is provided on the downstream side of the emission gas sensor 24.

A cylinder block of the engine 11 is provided with a cooling water temperature sensor 26 for sensing a cooling wafer temperature and a knock sensor 27 for sensing knocking. A crankshaft 28 has a crank angle sensor 29 provided on an outer peripheral side thereof, the crank angle sensor 29 outputting a pulse signal every time when the crankshaft 28 is rotated by a specified crank angle. A crank angle and an engine rotation speed are sensed on the basis of an output signal of the crank angle sensor 29.

An output of each of these various sensors is inputted to an electronic control unit (hereinafter described by "ECU") 30. The ECU 30 is mainly constructed of a microcomputer and executes various programs, which are stored in a ROM (storage medium) and control the engine, to thereby control a fuel injection quantity, an ignition timing, and a throttle opening (intake air volume) according to an engine operating state.

The ECU 30 calculates a required infection quantity according to the engine operating state (for example, engine rotation speed, engine load, or the like) and calculates an injection pulse width (injection time) according to the required injection quantity by the use of a map or a mathematical equation and opens the fuel injector 21 at the injection pulse width to thereby inject fuel of the required injection quantity.

Figure 2A:
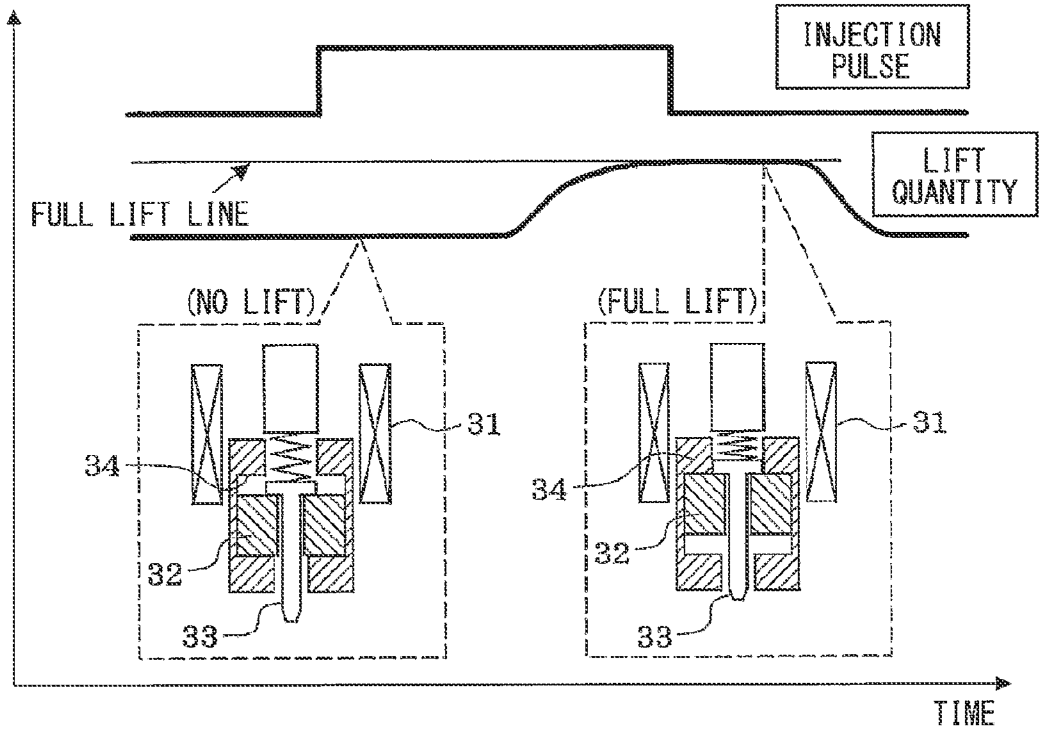
FIG. 2A is a diagram to show a foil lift and a partial lift of a fuel injector.
Figure 2B:
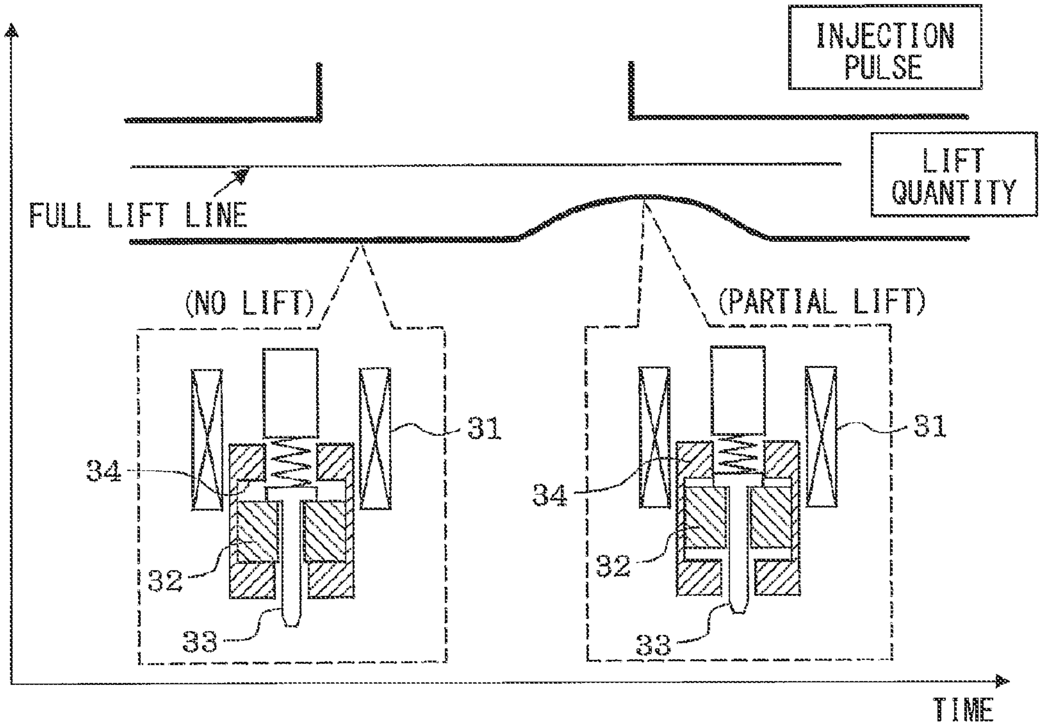
FIG. 2B is a diagram to show a full lift and a partial lift of the fuel injector.

The fuel injector 21 is constructed so as to integrally drive a plunger 32 and a needle valve 33 (valve body) in a valve-opening direction by an electromagnetic force developed by a drive coil 31. As shown in FIG. 2A, in a full lift range in which the injection pulse width is comparatively long, a lift quantity of the needle valve 33 reaches a full lift position (position in which the plunger 32 hits a stopper 34). As shown in FIG. 2B, in a partial lift range in which the injection pulse width is comparatively short, there is brought about a partial lift state in which the lift quantity of the needle valve 33 does not reach the full lift position (state in which the plunger 32 is yet to abut on the stopper 34).

Figure 3:
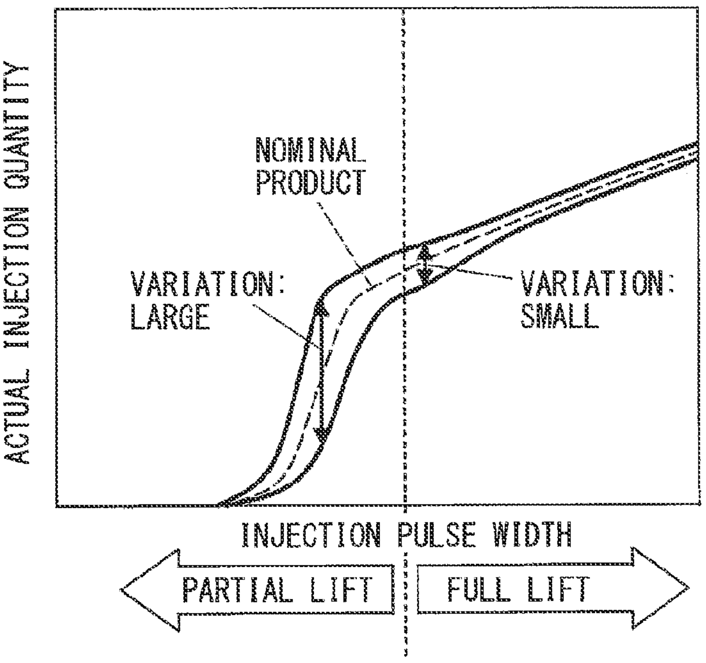
FIG. 3 is a diagram to show a relationship between an injection pulse width and an actual injection quantity of the fuel injector.

The fuel injector 21 of the direct injection type engine 11 that injects high-pressure fuel into a cylinder, as shown in FIG. 3, has a tendency that the linearity of change characteristics of an actual injection quantify with respect to the injection pulse width becomes worse in the partial lift range (range in which there is brought about the partial lift state in which the lift quantity of the needle valve 33 does not reach the full lift position because the injection pulse width is short). In this partial lift range, variations in the lift quantity of the needle valve 33 tend to be increased, whereby variations in an injection quantity tend to be increased. When the variations in the injection quantity are increased, there is a possibility that exhaust emission and drivability are made worse.

Figure 4:
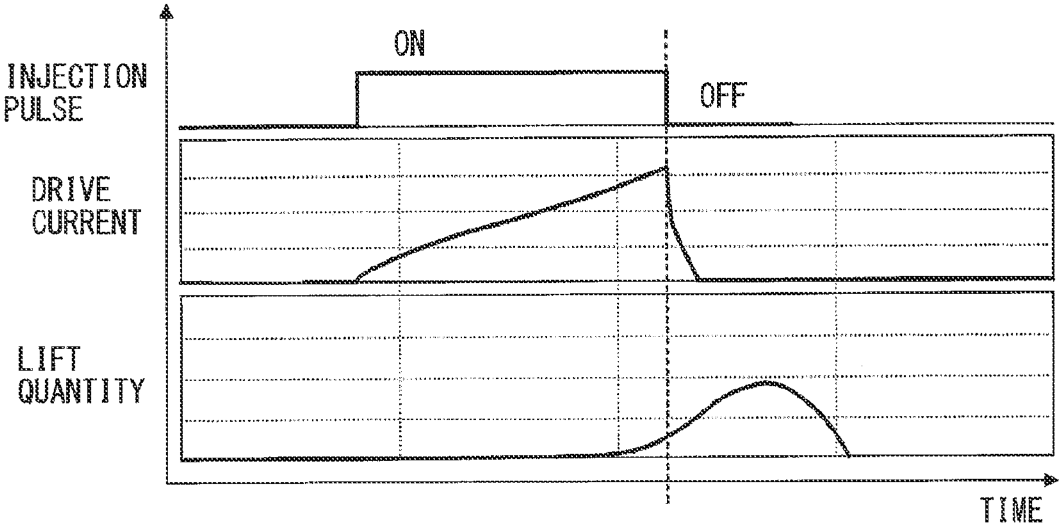
FIG. 4 is a time chart to show a behavior of a lift quantity and the like in a partial lift range.
Figure 5:
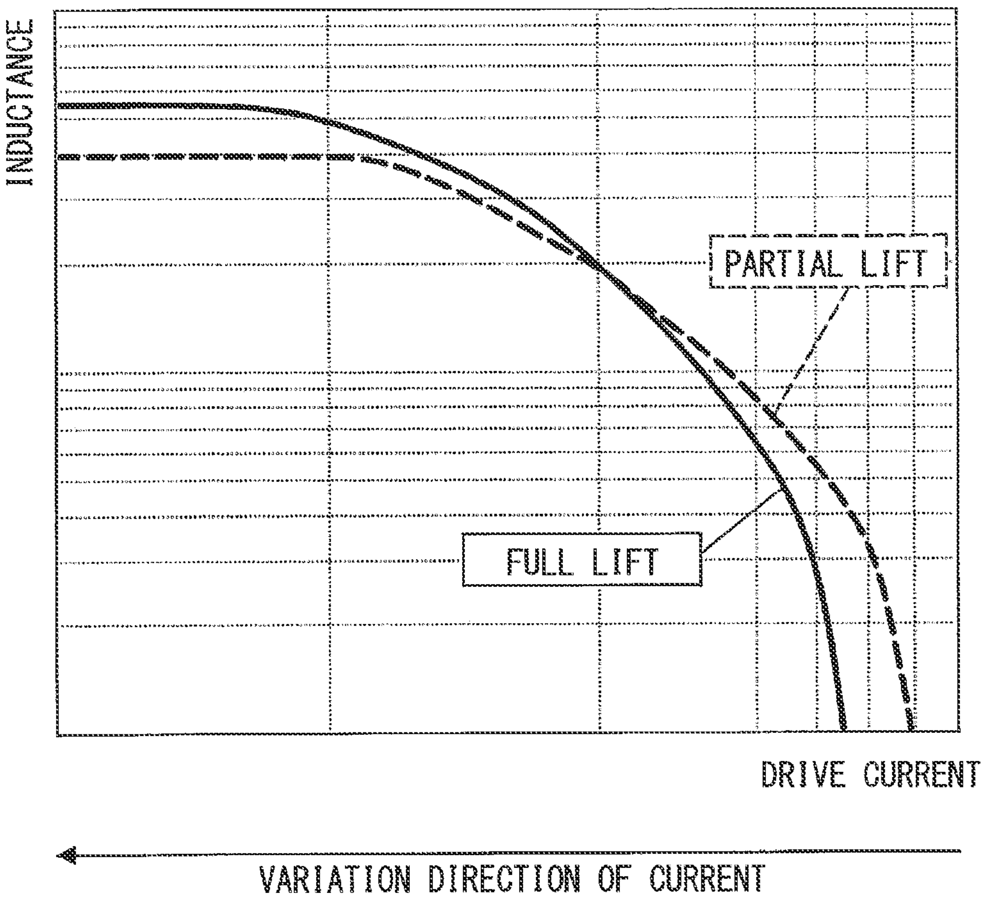
FIG. 5 is a graph to show a direct current superposition characteristic of a drive coil.

As shown in FIG. 4, in the partial lift range, an injection pulse is turned off around the time when the lift quantity of the needle valve 33 starts to increase along with an increase in a drive current (current flowing through a drive coil 31) when the injection pulse is turned on, so that the needle valve 33 exhibits a behavior such that after the infection pulse is turned off, the lift quantity of the needle valve 33 once increases and then decreases. Further, as shown in FIG. 5, the drive coil 31 has a direct current superposition characteristic such that the inductance of the drive coil 31 is varied according to the drive current (current flowing through the drive coil 31).

In the present embodiment, the ECU 30 performs an injection pulse learning routine shown in FIG. 6 and FIG. 7, which will be described later. When a specified learning condition is satisfied, the ECU 30 performs a partial lift injection in which the fuel injector 21 is opened by an injection pulse which brings about a partial lift state in which the lift quantity of the needle valve 33 does not reach the full lift position. The ECU 30 calculates an integrated value of the drive current flowing through the drive coil 31 after the injection pulse of this partial lit injection is turned off. The ECU 30 calculates the inductance of the drive coil 31 in consideration of the direct current superposition characteristic of the drive coil 31 on the basis of the integrated value of the drive current. The ECU 30 estimates the lift quantity of the needle valve 33 on the basis of the inductance and performs an injection pulse learning for correcting the injection pulse of the partial lift injection on the basis of the lift quantity.

In this injection pulse learning, by paying attention to the behavior such that in the partial lift range, after the injection pulse is turned off, the lift quantity of the needle valve 33 once increases and then decreases, the integrated value of the drive current flowing through the drive coil 31 is calculated after the injection pulse of the partial lift injection is turned off. By calculating the inductance of the drive coil 31 in consideration of the direct current superposition characteristic of the drive coil 31 on the basis of the integrated value of the drive current, the inductance of the drive coil 31 can be calculated with high accuracy. By estimating the lift quantity of the needle valve 33 on the basis of the inductance, the lift quantity of the needle valve 33 can be estimated with high accuracy. By correcting the injection pulse of the partial lift injection on the basis of the lift quantity estimated with high accuracy, the injection pulse of the partial lift injection can be corrected with high accuracy.

Specific processing contents of the injection pulse learning performed by the ECU 30 will be described by the use of a processing routine shown in FIG. 6 and FIG. 7 and time charts shown in FIG. 8 to FIG. 10. The time chart shown in FIG. 8 roughly corresponds to processing in steps 101 to 105 shown in FIG. 6 and the time chart shown in FIG. 9 roughly corresponds to processing in steps 102 to 113 shown in FIG. 6. Further, the time chart shown in FIG. 10 roughly corresponds to processing in steps 114 to 123 shown in FIG. 7.

Figure 6:
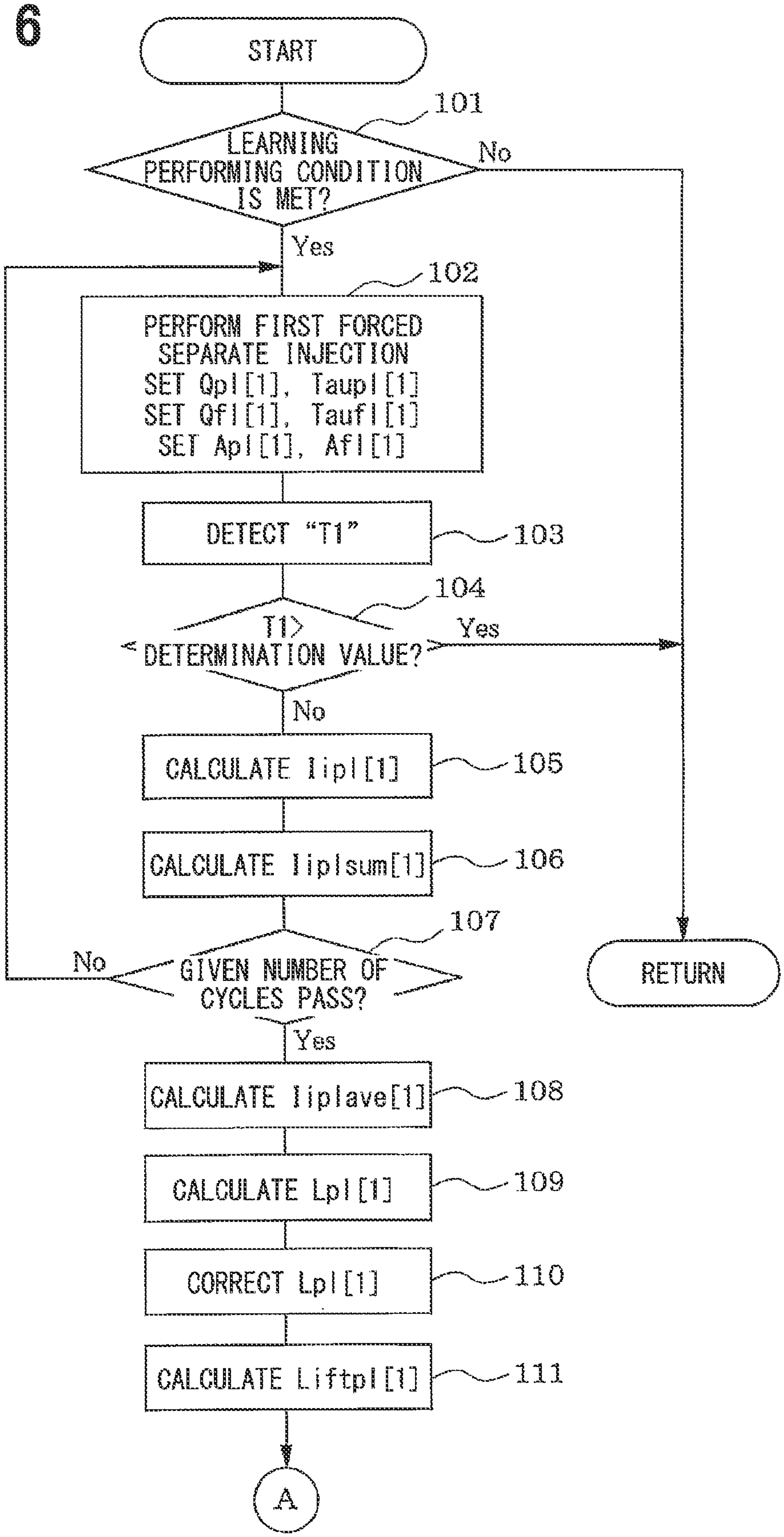
FIG. 6 is a flow chart to show a processing flow of an injection pulse learning routine.
Figure 7:
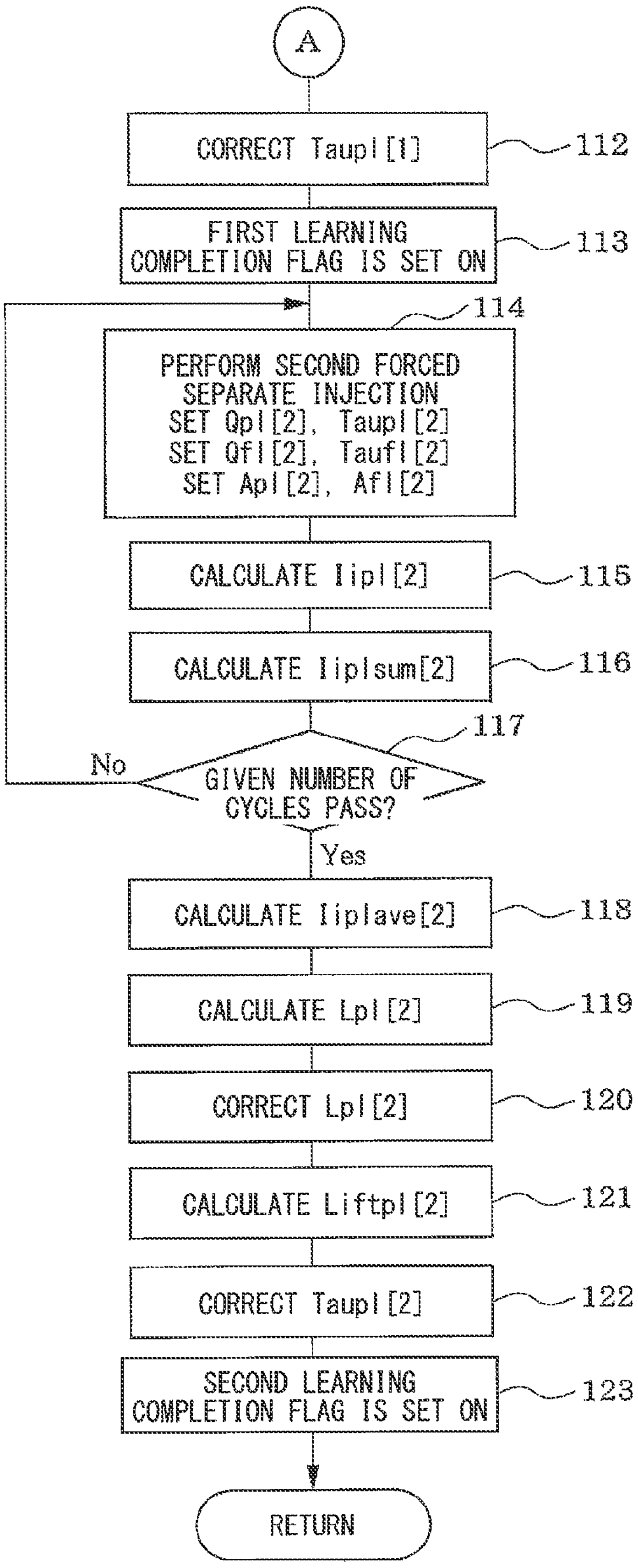
FIG. 7 is a flow chart to show the processing flow of the injection pulse learning routine.

The injection pulse learning routine shown in FIG. 6 and FIG. 7 is repeatedly performed at a given cycle during a period in which the power source of the ECU 30 is on (during a period in which an ignition switch is turned on), thereby serving as an injection pulse learning part.

In the step 101, whether or not a given learning condition is met is determined by whether or not all of the following conditions (1) to (4) are satisfied.

(1) A cooling water temperature is not less than a given temperature.

The given temperature of this condition (1) is set at a cooling water temperature (for example, 80° C.) corresponding to a state in which the fuel injected into the cylinder is warmed to a level at which the fuel is quickly evaporated.

(2) An engine load (for example, intake air volume, intake pipe pressure, or the like) is not less than a given value.

The given value of this condition (2) is set at a value corresponding to an intake air volume in which variations in an air-fuel ratio, which are caused by variations in the injection quantity of the partial lift injection, are within a given allowable range (for example, within 14.7±0.5).

(3) The fuel injector 21 is normal (for example, variations in the injection quantity at the time of the full lift injection in which the lift quantity of the needle valve 33 reaches the full lift position).

This condition (3) is determined on the basis of the diagnosis result of an abnormality diagnosis routine which is not shown.

(4) A learning completion flag (at least one of a first learning completion flag and a second learning completion flag) is off.

If all of the above-mentioned conditions (1) to (4) are satisfied, the learning performing condition is met. However, if any one of the above-mentioned conditions (1) to (4) is not satisfied, the learning performing condition is not met.

If it is determined in the step 101 that the learning performing condition is not met, the present routine is finished. For example, if the above-mentioned condition (3) is not satisfied (the variations in the injection quantity at the full lift injection are beyond the given range), it is determined that since the fuel injector 21 is abnormal, even if the partial lift injection is performed to thereby correct the injection pulse of the partial lift injection, the variations in the injection quantity cannot be corrected with high accuracy. Therefore, the partial lift injection and the correction of the injection pulse of the partial lift injection are prohibited.

Figure 8:
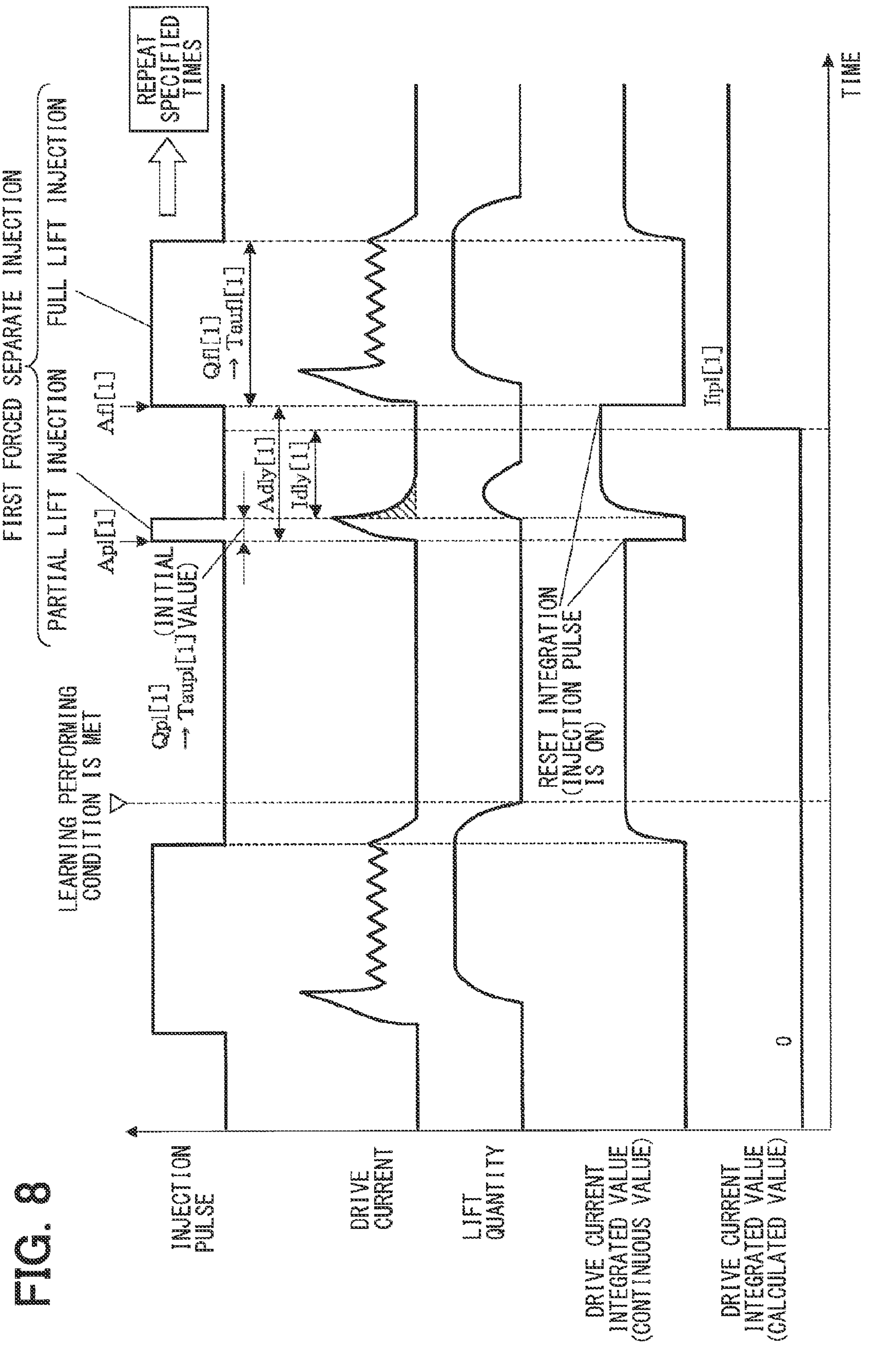
FIG. 8 is a time chart to show an example of performing an injection pulse learning.
Figure 9:
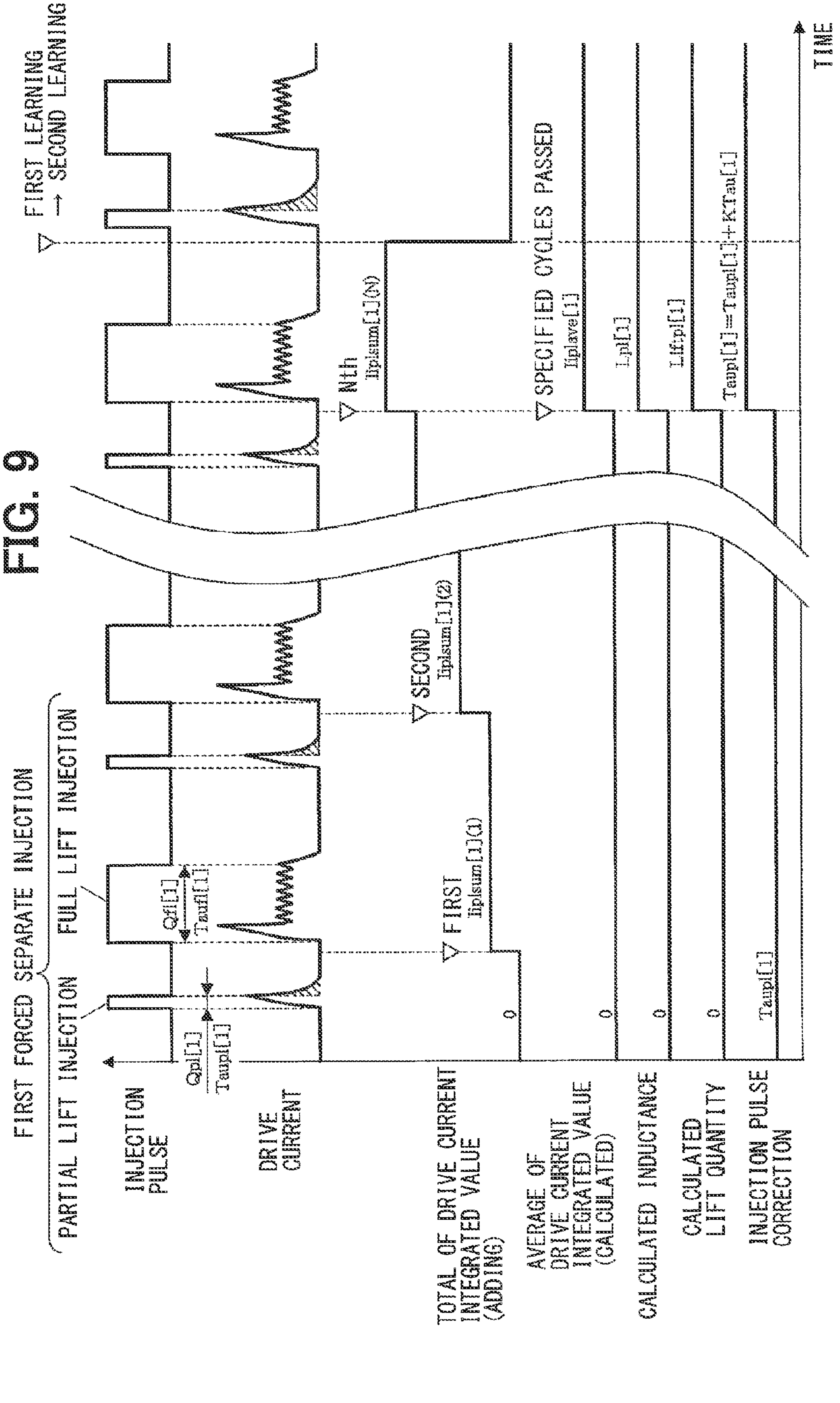
FIG. 9 is a time chart to show an example of performing the injection pulse learning.

If it is determined in the step 101 that the learning performing condition is met, the processing following the step 102 is performed in the step 102, a first forced separate injection (two injections in an intake stroke) is performed in which the fuel of a required injection quantity Qtotal per one cylinder is injected separately in one partial lift injection and in one full lift injection (see FIG. 8).

in the first forced separate injection, an injection quantity Qpl[1] of the partial lift injection is set at an injection quantity, which brings about a partial lift, state in a standard product (nominal product) of the fuel injector 21, and an injection pulse Taupl[1] of a pulse width corresponding to the injection quantity Qpl[1] of the partial lift injection is set.

A value obtained by subtracting the injection quantity Qpl [1] of the partial lift injection from the required injection quantity Qtotal is set as an injection quantity of the full lift injection Qfl[1]=Qtaotal−Qpl[1] and an injection pulse Taufl [1] of a pulse width corresponding to the injection quantity of the full lift injection Qfl[1] is set.

An injection timing Apl[1] of the partial lift injection is set at the same injection timing as the injection timing before the first forced separate injection being performed (before the learning performance condition being met), and a value obtained by adding a given delay value Adly[1] to the injection timing Apl[1] of the partial lift injection is set as an injection timing of the full lift injection Afl[1]=Apl[1]+Adly [1].

The given delay value Adly[1] is set so as to be longer than a value obtained by adding a given time Idly[1], which will be described later, to the injection pulse Taufl[1] (Adly[1]>Taufl [1]+Idly[1]).

In the step 103, a required time T1 is detected as the information of a change in the inductance caused by a factor other than the lift quantity of the needle valve 33, the required time T1 being the time required for the drive current to increase to a given value or more from the time (rise timing) when the injection pulse of the partial lift injection is turned on.

In the step 104, it is determined whether or not the required time T1 is more than a determination value. If it is determined that the required time T1 is more than the determination value, the processing following the step 105 is not performed but the present routine is finished. In this way, if the required time T1, which is required for the drive current to increase to the given value or more from the time when the injection pulse of the partial lift injection is turned on, is more than the determination time, it is determined that since the fuel injector 21 is abnormal, even if the partial lift injection is performed to thereby correct the injection pulse of the partial lift injection, the variations in the injection quantity cannot be corrected with high accuracy. Hence, the partial lift injection and the correction of the injection pulse of the partial lift injection are prohibited.

In the step 104, if it is determined that the required time T1 is not more than the determination value, the routine proceeds to the step 105, where the drive current is integrated from the time (fall timing) when the injection pulse of the partial lift injection is turned off to the time when the given time Idly[1] passes. In this way, the integrated value Iipl[1] of the drive current is calculated which flows through the drive coil 31 after the injection pulse is turned off. The given time Idly[1] is set at a period of time little longer than the time required for the drive current to converge to 0 from the time when the injection pulse is turned off.

In the step 106, the drive current integrated value Iipl[1] (n) of this time is added to the total value Iiplsum[1] (n−1) of the drive current integrated value of the last time, whereby the total value Iiplsum[1] (n) of the drive current integrated value of this time is found.

$$Iiplsum[1](n)=Iiplsum[1](n-1)+Iipl[1](n)$$

where it is assumed that the initial value Iiplsum[1] (0) of the total value of the drive current integrated value is zero.

In the step 107, it is determined whether or not a given number of cycles (N cycles) pass from the time when the first forced separate injection is started. In other words, if is determined whether or not the drive current integrated value Iipl[1] is added N times. The processing of the steps 102 to 106 is repeatedly performed until the given number of cycles (N cycles) pass to thereby update the total value Iiplsum[1] of the drive current integrated value (see FIG. 9). The processing of the steps 103, 104 following the second cycle may be omitted (that is, the processing of the steps 103, 104 may be performed only in first cycle).

Then, when it is determined that the given number of cycles (N cycles) pass from the time when the first forced separate injection is started (that is, the drive current integrated value Iipl[1] is added N times), the routine proceeds to the step 108, where the total value Iiplsum[1] of the drive current integrated value is divided by the number of times of addition N to thereby find an average value Iiplave[1] of the drive current integrated value.

$$Iiplave[1]=Iiplsum[1]/N$$

Figures 11A, 11B:
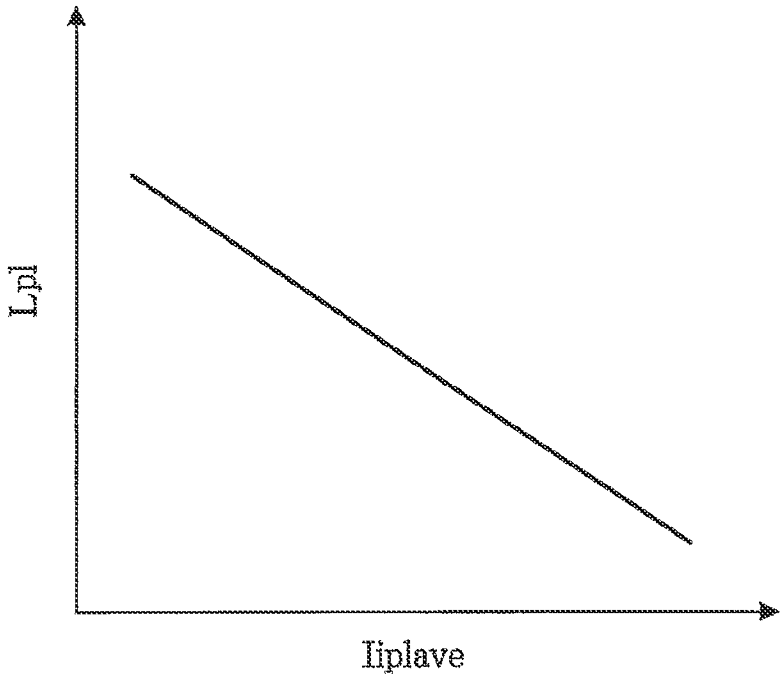
FIG. 11A is a chart to conceptually show a map used for calculating an inductance Lpl.
FIG. 11B is an example to show a mathematical formula used for calculating the inductance Lpl.

In the step 109, the inductance Lpl[1] of the drive coil 31 according to the average value I iplave[1] of the drive current integrated value is calculated by the use of a map shown in FIG. 11A or a mathematical formula shown in FIG. 11B. The map shown in FIG. 11A or the mathematical formula shown in FIG. 11B is made in advance on the basis of test data or design data in consideration of the direct current superposition characteristic of the drive coil 31 in the standard product (nominal product) of the fuel injector 21 and is stored in the ROM of the ECU 30.

In the step 110, a correction factor Kt according to the required time T1 detected in the step 103 (information of a change in the inductance caused by a factor other than the lift quantity) is calculated by the use of a map or a mathematical formula (not shown). The map or the mathematical formula of this correction factor KL is made in advance on the basis of test data or design data in the standard product (nominal product) of the fuel injector 21 and is stored in the ROM of the ECU 30. The inductance Lpl[1] is multiplied by the correction factor KL to thereby correct the inductance Lpl[1].

$$Lpl[1]=Lpl[1]\times KL$$

Figures 12A, 12B:
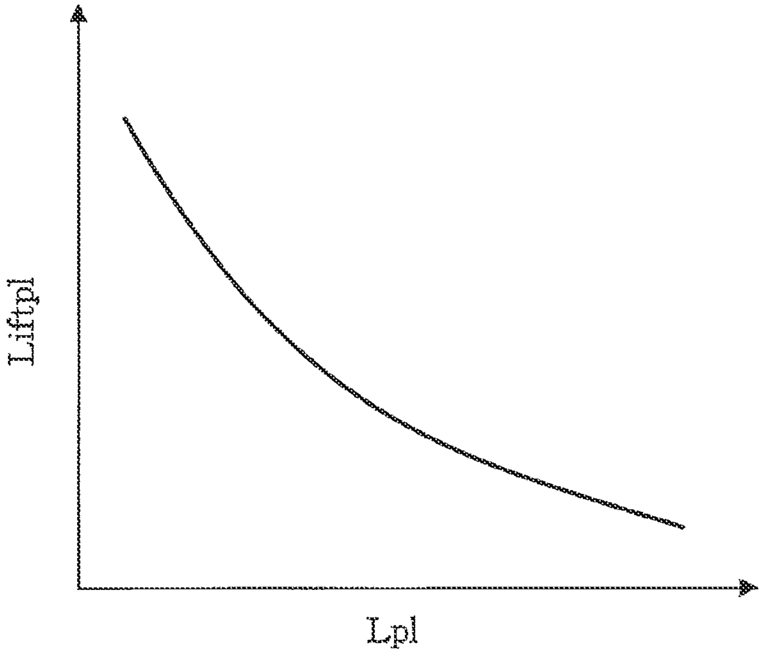
FIG. 12A is a chart to conceptually show a map used for calculating a lift quantity Liftpl.
FIG. 12B shows a mathematical formula used for calculating the lift quantity Liftpl.

In the step 111, the lift quantity Liftpl[1] of the needle valve 33 according to the inductance Lpl[1] is calculated (estimated) by the use of a map shown in FIG. 12A or a mathematical formula FIG. 12B. The map shown in FIG. 12A or the mathematical formula FIG. 12B is made in advance on the basis of test data or design data in the standard product (nominal product) of the fuel injector 21 and is stored in the ROM of the ECU 30.

In the step 112 (FIG. 7), a correction factor KTau[1] according to the lift quantity Liftpl[1] is calculated by the use of a map or a mathematical formula (not shown). The map or the mathematical formula of the correction factor KTau[1] is made in advance on the basis of test data or design data in the standard product (nominal product, of the fuel injector 21 and is stored in the ROM of the ECU 30. The correction factor KTau[1] is added to the injection pulse Taupl[1] corresponding to the injection quantity Qpl[1] of the partial lift injection to thereby correct the injection pulse Taupl[1] corresponding to the injection quantity Qpl[1] of the partial lift injection.

$$Taupl[1]=Taupl[1]+KTau[1]$$

In the step 113, it is determined that the learning of the injection pulse Taupl[1] corresponding to the injection quantity Qpl[1] of the partial lift injection is finished, and a first learning completion flag is set ON.

Figure 10:
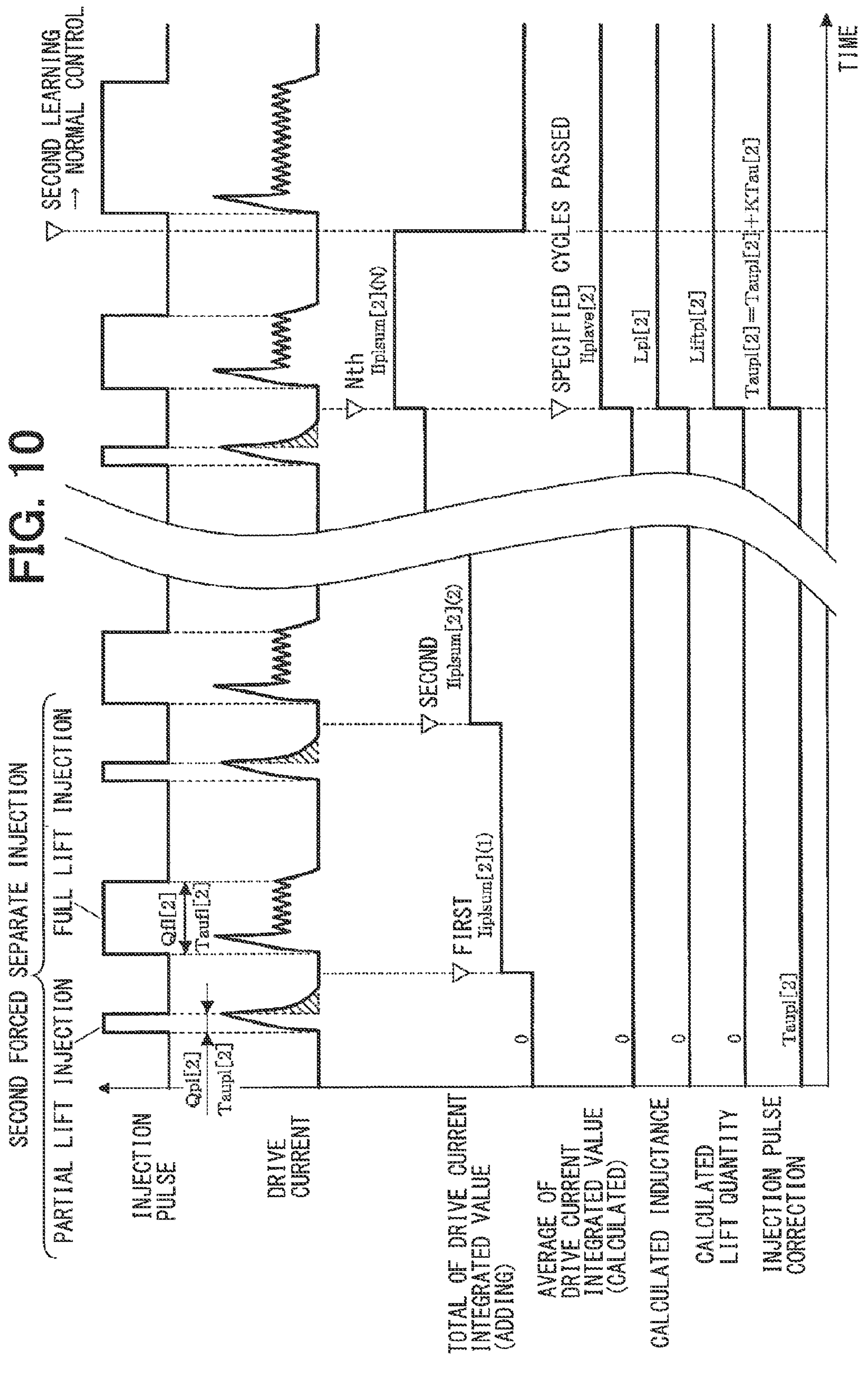
FIG. 10 is a time chart to show an example of performing the injection pulse learning.

In the step 114, a second forced separate injection (two injections in an intake stroke) is performed (see FIG. 10).

In the second forced separate injection, an injection quantity Qpl[2] of the partial lift injection is set at an injection quantity, which brings about a partial lift state in the standard product (nominal product) of the fuel injector 21 and is different from the injection quantity Qpl[1] of the first forced separate injection (injection quantity more than the injection quantity Qpl[1] or smaller than the infection quantity Qpl[1]), and an injection pulse Taupl[2] of a pulse width corresponding to the injection quantity Qpl[2] of the partial lift injection is set.

A value obtained by subtracting the injection quantity Qpl [2] of the partial lift injection from the required injection quantity Qtotal is set as an injection quantity of the full lift injection Qfl[2]=Qtotal−Qpl[2], and an injection pulse Taufl [2] of a pulse width corresponding to the injection quantify of the full lift injection Qfl[2] is set.

An injection timing Apl[2] of the partial lift injection is set at the same injection timing as the injection timing before the first forced separate injection being performed (before the learning performance condition being met), and a value obtained by adding a given delay value Adly[2] to the injection timing Apl[2] of the partial lift injection is set as an injection timing of the full lift injection Afl[2]=Apl[2]+Adly [2]. The given delay value Adly[2] is set so as to be longer than a value obtained by adding a given time Idly[2], which will be described later, to the injection pulse Taufl[2] (Adly[2]>Taufl [2]+Idly[2]).

In the step 115, the drive current is integrated from the time (fall timing) when the injection pulse of the partial lift injection is turned off to the time when a given delay time Idly[2] passes, whereby an integrated value Iipl[2] of the drive current flowing through the drive coil 31 after the injection pulse is turned off. Here, the given time Idly[2] is set at a period of time little longer than the time required for the drive current to converge to 0 from the time when the injection pulse is turned off.

In the step 116, the drive current integrated value Iipl[2] (n) of this time is added to the total value Iiplsum[2] (n−1) of the drive current integrated value of the last time, whereby the total value Iiplsum[2] (n) of the drive current integrated value of this time is found.

$$Iiplsum[2](n)=Iiplsum[2](n-1)+Iipl[2](n)$$

where it is assumed that the initial value Iiplsum[2] (0) of the total value of the drive current integrated value is zero.

In the step 117, it is determined whether or not a given number of cycles (N cycles) pass from the time when the second forced separate injection is started. In other words, it is determined whether or not the drive current integrated value Iipl[2] is added N times, The processing of the steps 114 to 116 is repeatedly performed until the given number of cycles (N cycles) pass to thereby update the total value Iiplsum[2] of the drive current integrated value (see FIG. 10).

When it is determined that the given number of cycles (N cycles) pass from the time when the second forced separate injection is started, the routine proceeds to the step 118, where the total value Iiplsum[2] of the drive current integrated value is divided by the number of times of addition N to thereby find an average value Iiplave[2] of the drive current integrated value.

$$Iiplave[2]=Iiplsum[2]/N$$

In the step 119, the inductance Lpl[2] of the drive coil 31 according to the average value Iiplave[2] of the drive current integrated value is calculated by the use of the map shown in FIG. 11A or the mathematical formula shown in FIG. 11B.

In the step 120, the inductance Lpl[2] is multiplied by the correction factor KL calculated in the step 110 to thereby correct the inductance Lpl[2].

$$Lpl[2]=Lpl[2]\times KL$$

In the step 121, the lift quantity Liftpl[2] of the needle valve 33 according to the inductance Lpl[2] is calculated (estimated) by the use of the map or the mathematical formula shown in FIG. 12.

In the step 122, a correction factor KTau[2] according to the lift quantity Liftpl[2] is calculated by the use of a map or a mathematical formula (not shown). The correction factor KTau[2] is added to the injection pulse Taupl[2] corresponding to the injection quantity Qpl[2] of the partial lift injection to thereby correct the injection poise Taupl[2] corresponding to the injection quantity Qpl[2] of the partial lift injection.

$$Taupl[2]=Taupl[2]+KTau[2]$$

In the step 123, it is determined that the learning of the injection pulse Taupl[2] corresponding to the injection quantity Qpl[2] of the partial lift injection is finished, and a second learning completion flag is set ON.

As described above, when the injection pulses Taupl[1], Taupl[2], which respectively correspond to the injection quantities Qpl[1], Qpl[2] of at least two points in the partial lift range are corrected (learned), the injection pulse corresponding to the other injection quantity in the partial lift range can be also calculated (for example, interpolated) on the basis of data of this learning.

In the routine shown in FIG. 6 and FIG. 7, the injection pulses Taupl[1], Taupl[2] which respectively correspond to the injection quantities Qpl[1], Qpl[2] of two points in the partial lift range are corrected (learned). However, the method of correcting (learning) the injection pulse is not limited to this method but the injection pulses corresponding to the injection quantities of three point or more in the partial lift range may be corrected (learned).

In the present embodiment described above, by paying attention to the behavior such that in the partial lift range, after the injection pulse is turned off, the lift quantity of the needle valve 33 once increases and then decreases, the integrated value of the drive current is calculated which flows through the drive coil 31 after the injection pulse of the partial lift injection is turned off. The inductance of the drive coil 31 is calculated in consideration of the direct current superposition characteristic of the drive coil 31 on the basis of the integrated value of the drive current. Hence, the inductance of the drive coil 31 can be calculated with high accuracy. Since the lift quantity of the needle valve 33 is estimated on the basis of the inductance, the lift quantity of the needle valve 33 can be estimated with high accuracy. Then, since the injection pulse of the partial lift injection is corrected on the basis of the lift quantity estimated with high accuracy, the injection pulse of the partial lift injection can be corrected with high accuracy. In this way variations in the injection quantity caused by variations in the lift quantity in the partial lift range can be corrected with high accuracy, which can hence improve the accuracy of an injection quantity control in the partial lift range.

In the present embodiment, the injection pulse is corrected by the use of the correction factor according to the estimated (calculated) lift quantity. However, the method of correcting the injection pulse according to the estimated lift quantity is not limited to this method but may be appropriately changed. For example, the injection quantity pulse may be corrected on the basis of a deviation between the estimated lift quantity and a reference value (lift quantity in the standard product of the fuel injector 21).

In the present embodiment, when the partial lift injection is performed, a required injection quantity according to the engine operating state is injected separately in the injection quantity of the partial lift injection and in the injection quantity of the full lift injection (injection quantity obtained by subtracting the injection quantity of the partial lift quantity from the required injection quantity). Hence, the partial lift infection can be performed with the total injection quantity of the fuel injector 21 kept at the required injection quantity.

In the present embodiment, when an engine load is not less than a given value (value corresponding to an intake air volume which brings variations in the air-fuel ratio caused by variations in the injection quantity of the partial lift injection within a given allowable range), the learning performance condition is met. Hence, when the engine load is not less than the given value and the variations in the air-fuel ratio caused by variations in the injection quantity of the partial lift infection are brought within the given allowable range, the partial lift injection is performed, whereby the injection pulse of the partial lift injection can be corrected. Therefore, it is possible to prevent a combustion state from being made worse by the partial lift injection for correcting the injection pulse.

In the present embodiment the required time T1, which is required for the drive currant to increase to a value not less than the given value from the time when the injection pulse of the partial lift injection is turned on, is detected as the information of a change in the inductance caused by a factor other than the lift quantity of the needle valve 33, and the inductance is corrected according to the required time T1. Hence, the inductance can be found in consideration of also a change in the inductance caused by a factor (for example, temperature or the like) other than the lift quantity of the needle valve 33.

In the present embodiment, the inductance is directly corrected by the use of the correction factor according to the required time T1. The method of correcting an inductance according to the required time T1 is not limited to this method but may be appropriately changed, for example, a map or a mathematical formula (that shows the relationship between the drive current integrated value and the inductance), which is used for calculating the inductance, may be corrected according to the required time T1.

In the present embodiment, in the case where the variations in the injection quantity in the full lift injection is beyond the given range or in the case where the required time T1, which is required for the drive current to increase to the given value or more from the time when the injection pulse of the partial lift injection is turned on, is more than the determination value, it is determined that because the fuel injector 21 is abnormal, even if the partial lift injection is performed to thereby correct the injection pulse of the partial lift injection, the variations in the injection quantity cannot be corrected with high accuracy. Hence, the partial lift injection and the correction of the injection pulse of the partial lift injection are prohibited. A partial lift injection other than the partial lift injection for correcting the injection pulse may be prohibited until the correction of the injection pulse of the partial lift injection is completed (until both of the first learning completion flag and the second learning completion flag are set ON). This can prevent exhaust emission and drivability from being made worse by the variations in the injection quantity of the partial lift injection before the correction of the injection pulse of the partial lift injection is completed.

In the present embodiment, when the fuel of the required injection quantity is injected separately in the partial lift injection and in the full lift injection, the fuel of the required injection quantity is divided into one partial lift injection and one full lift injection. The number of times of injection of the partial lift injection and the full lift injection is not limited to this but may be appropriately changed according to the required injection quantity or the like, for example, the number of times of injection of the partial lift injection may be two or more or the number of times of injection of the fuel lift injection may be two or more.

In addition, the present disclosure is not limited to the direct injection type engine shown in FIG. 1 but can be carried out in various modifications within a scope not departing from the gist of the disclosure, for example, can be applied to an intake port injection type engine.

The invention claimed is:

1. A fuel injection control device for an internal combustion engine provided with a fuel injector in which a valve body is opened by an electromagnetic force of a drive coil, the fuel injection control device comprising:

a fuel injection part that performs a full lift injection for opening the fuel injector by an injection pulse in which a lift quantity of the valve body reaches a full lift position and a partial lift injection for opening the fuel injector by an injection pulse in which a lift quantity of the valve body does not reach the full lift position;

a lift quantity estimation part that calculates an inductance of the drive coil in consideration of a direct current superposition characteristic of the drive coil on the basis of a drive current flowing through the drive coil after an injection pulse of the partial lift injection is turned off and that estimates a lift quantity of the valve body at the time of the partial lift injection on the basis of the inductance; and an injection pulse correction part that corrects the injection pulse of the partial lift injection on the basis of the lift quantity of the valve body estimated by the lift quantity estimation part.

2. The fuel injection control device for an internal combustion engine according to claim 1, wherein when the fuel injection part performs the partial lift injection, the fuel injection part injects a required injection quantity according to an operating state of the internal combustion engine separately in an injection quantity of the partial lift injection and in an injection quantity of the full lift injection.

3. The fuel injection control device for an internal combustion engine according to claim 1, wherein the lift quantity estimation part estimates the lift quantity at the time of the partial lift injection in a case where a given performance condition is met, wherein the given performance condition is met at least when a load of the internal combustion engine is not less than a given value, and wherein the given value is set at a value corresponding to an intake air volume in which variations in an air-fuel ratio caused by variations in an injection quantity of the partial lift injection is within a given allowable range.

4. The fuel injection control device for an internal combustion engine according to claim 1, wherein the lift quantity estimation part integrates the drive current flowing through the drive coil after the injection pulse of the partial lift injection is turned off to thereby calculate the inductance of the drive coil in consideration of the direct current superposition characteristic of the drive coil.

5. The fuel injection control device for an internal combustion engine according to claim 1, wherein the lift quantity estimation part includes a rise time detection part and an inductance correction part, wherein the rise time detection part detects a required time as information of a change in the inductance caused by a factor other than the lift quantity of the valve body, the required time being required for the drive current to increase to a given value or more from a time when the injection pulse of the partial lift injection is turned on, and wherein the inductance correction part corrects the inductance according to the required time detected by the rise time detection part.

6. The fuel injection control device for an internal combustion engine according to claim 1, wherein in a case where variations in an injection quantity in the full lift injection in which the lift quantity of the valve body reaches the full lift position is beyond a given range and/or in a case where a required time, which is required for the drive current to increase to a given value or more from a time when the injection pulse of the partial lift injection is turned on, is more than a determination value, the partial lift injection and a correction of the injection pulse of the partial lift injection are prohibited.

7. The fuel injection control device for an internal combustion engine according to claim 1, wherein until a correction of the injection pulse of the partial lift injection is completed, a partial lift injection other than a partial lift injection for correcting the injection pulse is prohibited.

* * * * *